United States Patent
Chen et al.

(10) Patent No.: US 10,999,175 B2
(45) Date of Patent: May 4, 2021

(54) NETWORK DATA FLOW CLASSIFICATION METHOD AND SYSTEM

(71) Applicant: Huawei Technologies Co., Ltd., Shenzhen (CN)

(72) Inventors: Zhitang Chen, Hong Kong (CN); Yanhui Geng, Montreal (CA); Georgios Trimponias, Hong Kong (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 58 days.

(21) Appl. No.: 16/362,135

(22) Filed: Mar. 22, 2019

(65) Prior Publication Data

US 2019/0222499 A1 Jul. 18, 2019

Related U.S. Application Data

(63) Continuation of application No. PCT/CN2017/102825, filed on Sep. 22, 2017.

(30) Foreign Application Priority Data

Sep. 22, 2016 (CN) .......................... 201610842056.0

(51) Int. Cl.
*H04L 12/26* (2006.01)
*H04L 12/24* (2006.01)
(Continued)

(52) U.S. Cl.
CPC ............ *H04L 43/0888* (2013.01); *G06K 9/62* (2013.01); *H04L 41/14* (2013.01); *H04L 41/16* (2013.01);
(Continued)

(58) Field of Classification Search
None
See application file for complete search history.

(56) References Cited

U.S. PATENT DOCUMENTS 8,031,299 B2  10/2011  Mori et al.
2005/0177644 A1  8/2005  Basso et al.
(Continued)

FOREIGN PATENT DOCUMENTS

CN     101276420 A    10/2008
CN     101599895 A    12/2009
(Continued)

OTHER PUBLICATIONS

Yuan, Y., "Network Communication Behavior Modeling Method Based on Data Classification Research," University of Electronic Science and Technology, Feb. 2016, 80 pages. With English abstract.
(Continued)

*Primary Examiner* — Saad Khawar
(74) *Attorney, Agent, or Firm* — Conley Rose, P.C.

(57) ABSTRACT

A network data flow classification method related to artificial intelligence includes collecting an information set, including a plurality of pieces of dimension information, of a to-be-processed data flow, establishing a static behavior model and a dynamic behavior model of each piece of dimension information in the information set, where the static behavior model represents a value selection rule of the dimension information, and the dynamic behavior model represents a correlation relationship of the dimension information between two adjacent time moments, obtaining, using the static behavior model and the dynamic behavior model respectively, a static model distance and a dynamic model distance between the to-be-processed data flow and a data flow of each target application type, determining an
(Continued)

application type of the to-be-processed data flow based on the static model distance and the dynamic model distance.

20 Claims, 6 Drawing Sheets

(51) Int. Cl.
*H04L 12/851* (2013.01)
*H04L 29/08* (2006.01)
*G06K 9/62* (2006.01)

(52) U.S. Cl.
CPC ........ *H04L 43/026* (2013.01); *H04L 47/2441* (2013.01); *H04L 67/32* (2013.01)

(56) References Cited

U.S. PATENT DOCUMENTS

| | | | |
|---|---|---|---|
| 2006/0239219 | A1 | 10/2006 | Haffner et al. |
| 2008/0021899 | A1 | 1/2008 | Avidan et al. |
| 2008/0082475 | A1 | 4/2008 | Aggarwal et al. |
| 2010/0203876 | A1* | 8/2010 | Krishnaswamy ..... H04L 67/025 455/418 |
| 2013/0100849 | A1* | 4/2013 | Szabo .................. G06K 9/6292 370/253 |
| 2013/0148513 | A1* | 6/2013 | Szabo ..................... H04L 41/16 370/252 |
| 2017/0230279 | A1* | 8/2017 | Mozolewski ........... H04L 69/22 |

FOREIGN PATENT DOCUMENTS

| | | |
|---|---|---|
| CN | 101977146 A | 2/2011 |
| CN | 102724317 A | 10/2012 |
| CN | 103235928 A | 8/2013 |
| CN | 103678512 A | 3/2014 |
| CN | 105809958 A | 7/2016 |

OTHER PUBLICATIONS

Machine Translation and Abstract of Chinese Publication No. CN101599895, Dec. 9, 2009, 18 pages.
Machine Translation and Abstract of Chinese Publication No. CN102724317, Oct. 10, 2012, 23 pages.
Machine Translation and Abstract of Chinese Publication No. CN103678512, Mar. 26, 2014, 15 pages.
Foreign Communication From A Counterpart Application, PCT Application No. PCT/CN2017/102825, English Translation of International Search Report dated Dec. 13, 2017, 2 pages.
Foreign Communication From A Counterpart Application, PCT Application No. PCT/CN2017/102825, English Translation of Written Opinion dated Dec. 13, 2017, 5 pages.

\* cited by examiner

NETWORK DATA FLOW CLASSIFICATION METHOD AND SYSTEM

CROSS-REFERENCE TO RELATED APPLICATIONS

This application is a continuation of International Patent Application No. PCT/CN2017/102825 filed on Sep. 22, 2017, which claims priority to Chinese Patent Application No. 201610842056.0 filed on Sep. 22, 2016. The disclosures of the aforementioned applications are hereby incorporated by reference in their entireties.

TECHNICAL FIELD

This application relates to the field of data processing, and in particular, to a network data flow classification method and system.

BACKGROUND

With increasing popularity of Internet technologies, especially popularity of mobile terminals, data flows of a growing quantity of application types such as an interaction type, a bulk data transmission type, a stream application type, and an abnormal-flow type are emerging in a communications network. Data flows of different application types impose different network service requirements. Therefore, different quality of service usually needs to be provided for the data flows of different application types. For example, data of the interaction type, such as data generated by remote login, has a relatively high delay requirement for the network and has a relatively high real-time requirement, data of the bulk data transmission type, such as file or video download, does not have a high real-time requirement, but a sufficient throughput needs to be ensured, data of the stream application type, such as online video viewing or multimedia conferencing, has a relatively high real-time requirement, and also has a high requirement for network transmission parameters such as jitter and a packet loss rate, alternatively, abnormal data, which needs to be restricted or prohibited by taking a measure because the abnormal data may be used to maliciously attack and even attempt to paralyze the network, and the like.

To provide different quality of service for the data flows of different application types, the application types of the data flows in the network need to be accurately classified before a service is provided. In other approaches, the following three solutions are usually used for implementation.

In a solution, application type classification is performed on a data flow based on a server port number or a client port number of the data flow. However, in this solution, a port number needs to be correlated with an application type of a data flow in advance based on the Internet Assigned Number Authority (IANA). The IANA cannot define data flows of all application types, and many applications are not subject to a rule of the IANA, and are assigned port numbers randomly. Therefore, this solution has a limitation on application type classification.

In another solution, in-depth packet parsing is performed on packet content of a data flow in order to identify an abnormal data flow. However, this solution still has a limitation due to inapplicability in a network scenario of data flow packet encryption.

In still another solution, feature extraction is performed on a data flow, machine learning is performed to obtain a classifier through training based on feature, and then application type classification is performed on the data flow. However, in this solution, feature engineering needs to be performed in advance. For example, simple statistics collection needs to be performed on data packet lengths of the data flow to calculate an average value, a variance, a maximum value, a minimum value, and the like of the data packet lengths and use the values as features. However, these features cannot completely represent a behavior of the entire data flow. For example, two data flows of different application types may have a same average value and variance. In this case, application type classification of the data flows is inaccurate.

Therefore, a technical solution that can accurately implement application type classification of data flows in a network is urgently needed to provide different quality of service for data flows of different application types.

SUMMARY

In view of this, this application is to provide a network data flow classification method and system, to resolve a technical problem of inaccurate application type classification of data flows.

A first aspect of the present disclosure provides a network data flow classification method, includes collecting an information set of a to-be-processed data flow, where the information set includes a plurality of pieces of dimension information, establishing a static behavior model and a dynamic behavior model that are of each piece of dimension information in the information set, obtaining, using the static behavior model and the dynamic behavior model respectively, a static model distance and a dynamic model distance that are between the to-be-processed data flow and a data flow of each target application type, and finally determining an application type of the to-be-processed data flow based on these static model distances and dynamic model distances. It can be learned that, when application type classification is performed on the data flow, the static behavior model representing a value selection rule and the dynamic behavior model representing a correlation relationship of the dimension information between two adjacent time moments are established based on each piece of dimension information in the information set of the data flow in order to more accurately reflect an essential difference between data flows, and then distance comparison is performed on the established behavior models and corresponding behavior models of the data flow of the target application type to implement data flow classification. This improves accuracy of application type classification of the data flow.

A second aspect of the present disclosure provides a network data flow classification system, including a slave server including an information collection module that is configured to collect an information set of a to-be-processed data flow transmitted by a terminal, and a master server including a data interface that is configured to obtain the information set collected by the information collection module, a memory that stores an application program and data generated during running of the application program, and a processor, where the processor runs the application program, to establish a static behavior model and a dynamic behavior model that are of each piece of dimension information in the information set, then obtain, using the static behavior model and the dynamic behavior model respectively, a static model distance and a dynamic model distance that are between the to-be-processed data flow and a data flow of each target application type, and finally determine an application type of the to-be-processed data flow based on the static model distance and the dynamic model distance. It can be learned that, when the system performs application type classification on the data flow, each information collection module in the slave server first collects the information set of the to-be-processed data flow, then the master server establishes, based on each piece of dimension information in the information set of the data flow, the static behavior model representing a value selection rule and the dynamic behavior model representing a correlation relationship of the dimension information between two adjacent time moments in order to more accurately reflect an essential difference between data flows, and then distance comparison is performed on the established behavior models and corresponding behavior models of the data flow of the target application type, to implement data flow classification. This improves accuracy of application type classification of the data flow.

In an implementation, the information set includes a first information set at a flow layer and a second information set at a connection layer. The first information set includes at least a packet length and a packet arrival time interval. The second information set includes at least a data flow length, a quantity of packets in the data flow, data flow duration, and a data flow arrival time interval. Therefore, the static behavior model and the dynamic behavior model that are established based on the packet length, the packet arrival time interval, the data flow length, the quantity of packets in the data flow, the data flow duration, and the data flow arrival time interval can more accurately reflect an essential difference between data flows. Then, distance comparison is performed between the established behavior models and corresponding behavior models of the data flow of the target application type such that application type classification of the data flow can be more accurate.

In an implementation, that the processor establishes the static behavior model and the dynamic behavior model of each piece of dimension information in the information set includes obtaining marginal probability distribution of each piece of dimension information in the first information set, where the marginal probability distribution represents a value selection rule of the dimension information, and generating a static behavior model of each piece of dimension information in the first information set based on the marginal probability distribution of each piece of dimension information in the first information set, obtaining conditional probability distribution of each piece of dimension information in the first information set, where the conditional probability distribution represents a correlation relationship of the dimension information between the two adjacent time moments, and generating a dynamic behavior model of each piece of dimension information in the first information set based on the conditional probability distribution of each piece of dimension information in the first information set, obtaining marginal probability distribution of each piece of dimension information in the second information set, where the marginal probability distribution represents a value selection rule of the dimension information, and generating a static behavior model of each piece of dimension information in the second information set based on the marginal probability distribution of each piece of dimension information in the second information set, and obtaining conditional probability distribution of each piece of dimension information in the second information set, where the conditional probability distribution represents a correlation relationship of the dimension information between the two adjacent time moments, and generating a dynamic behavior model of each piece of dimension information in the second information set based on the conditional probability distribution of each piece of dimension information in the second information set. It can be learned that application type classification is performed on the data flow by calculating probability distribution such that behavior models representing different application types are more accurate, thereby further accurately performing application type classification on the data flow.

In an implementation, that the processor establishes the static behavior model and the dynamic behavior model of each piece of dimension information in the information set includes obtaining a static behavior model of each piece of dimension information in the first information set using $$\mu_{p,i} = \frac{1}{n}\sum_{i=1}^{n}\varphi(x_i),$$

where $X_i$ is an $i^{th}$ piece of dimension information in the first information set $I_t^p$, n is a quantity of pieces of dimension information in the first information set $I_t^p$, and $\varphi$ is a feature function vector of a kernel function $k(x,y)$, obtaining a dynamic behavior model of each piece of dimension information, at the two adjacent time moments, in the first information set using $U_{p,i} = \Phi_{t+1}(K_{tt}+\lambda I)^{-1}\Phi_t^T$, where t is a time moment, $\Phi_{t+1} = [\varphi(X_2)\ \varphi(x_3)\ \ldots\ \varphi(x_{n+1})]$, $\Phi_t = [\varphi(x_1)\ \varphi(x_2)\ \ldots\ ^{SM}(x_n)]$, $K_{tt}$ is a matrix constituted by the dimension information in the first information set, $[K_{tt}]_{ij}$ is a $j^{th}$ matrix element in an $i^{th}$ row of the matrix, $[K_{tt}]_{ij} = k(x_i, x_j)$, $x_i$ is the $i^{th}$ piece of dimension information in the first information set $I_t^p$, n is the quantity of pieces of dimension information in the first information set $I_t^p$, $\varphi$ is the feature function vector of the kernel function $k(x,y)$, $\lambda$ is a preset parameter, and I is a unit matrix, obtaining a static behavior model of each piece of dimension information in the second information set $I_t^c$, using $$\mu_{c,i} = \frac{1}{n}\sum_{i=1}^{n}\varphi(x_i),$$

where $x_i$ is an $i^{th}$ piece of dimension information in the second information set $I_t^c$, and n is a quantity of pieces of dimension information in the second information set $I_t^c$, and obtaining a dynamic behavior model of each piece of dimension information, at the two adjacent time moments, in the second information set using $U_{c,i} = \Phi_{t+1}(K_{tt}+\lambda I)^{-1}\Phi_t^T$, where t is the time moment, $\Phi_{t+1} = [\varphi(x_2)\ \varphi(x_3) \ldots \varphi(x_{n+1})]$, $\Phi_t = [\varphi(x_1)\ \varphi(x_1)\varphi(x_2) \ldots \varphi(x_n)]$, $K_{tt}$ is a matrix constituted by the dimension information in the second information set, $[K_{tt}]_{ij}$ is a $j^{th}$ matrix element in an $i^{th}$ row of the matrix, $[K_{tt}]_{ij} = k(x_i,x_j)$, is the $i^{th}$ piece of dimension information in the second information set $I_t^c$, n is the quantity of pieces of dimension information in the second information set $I_t^c$, and $\varphi$ is the feature function vector of the kernel function $k(x,y)$. It can be learned that application type classification is performed on the data flow by calculating probability distribution such that behavior models representing different application types are more accurate, thereby further accurately performing application type classification on the data flow.

In an implementation, that the processor obtains, using the static behavior model and the dynamic behavior model respectively, the static model distance and the dynamic model distance that are between the to-be-processed data flow and the data flow of each target application type includes obtaining, using $$D[\{I_t^P\}_i^A \| \{I_t^P\}_i^B] = \|\mu_{p,i}^A - \mu_{p,i}^B\| = \sqrt{\frac{1}{n^2} tr\{K_{tt}^A - 2K_{tt}^{AB} + K_{tt}^B\}},$$

a flow-layer static model distance between a to-be-processed data flow A and a data flow B of each target application type, where $\mu_{p,i}^A$ is a static behavior model of a first information set $I_t^P$ of the to-be-processed data flow A, $\mu_{p,i}^B$ is a flow-layer static behavior model of the data flow B of the target application type, $[K_{tt}^A]_{ij} = k(x_i^A, x_j^A)$, $[K_{tt}^{AB}]_{ij} = k(x_i^A, x_j^B)$, $[K_{tt}^B]_{ij} = k(x_i^B, x_j^B)$, and i indicates an $i^{th}$ piece of dimension information in the information set, obtaining, using $$D[\{I_t^c\}_i^A \| \{I_t^c\}_i^B] = \|\mu_{c,i}^A - \mu_{c,i}^B\| = \sqrt{\frac{1}{n^2} tr\{K_{tt}^A - 2K_{tt}^{AB} + K_{tt}^B\}},$$

a connection-layer static model distance between the to-be-processed data flow A and the data flow B of each target application type, where $\mu_{c,i}^A$ is a static behavior model of a second information set $I_t^c$ of the to-be-processed data flow A, and $\mu_{c,i}^B$ is a connection-layer static behavior model of the data flow B of the target application type, obtaining, using $D[p(\{I_{t+1}^P\}_i^A | \{I_t^P\}_i^A) \| p(\{I_{t+1}^P\}_i^B | \{I_t^P\}_i^B)] = \|U_{p,i}^A - U_{p,i}^B\|$, a flow-layer dynamic model distance between the to-be-processed data flow A and the data flow B of each target application type, where $U_{p,i}^A$ is the static behavior model of the first information set $I_t^P$ of the to-be-processed data flow A, and $U_{p,i}^B$ is the flow-layer static behavior model of the data flow B of the target application type, and obtaining, using $CD[p(\{I_{t+1}^C\}_i^A | \{I_t^c\}_i^A) \| p(\{I_{t+1}^c\}_i^B | \{I_t^c\}_i^B)] = \|U_{c,i}^A - U_{c,i}^B\|$, a connection-layer dynamic model distance between the to-be-processed data flow A and the data flow B of each target application type, where $U_{c,i}^A$ is a dynamic behavior model of the second information set $I_t^c$ of the to-be-processed data flow A, and $U_{c,i}^B$ is a connection-layer dynamic behavior model of the data flow B of the target application type. It can be learned that the static model distance and the dynamic model distance that are between the to-be-processed data flow and the data flow of each target application type are obtained, and application type classification is performed on the data flow based on a distance, thereby further improving accuracy of application type classification of the data flow.

In an implementation, that the processor determines the application type of the to-be-processed data flow based on the static model distance and the dynamic model distance that are between the to-be-processed data flow and the data flow of each target application type includes performing weighted processing on the static model distance and the dynamic model distance that are between the to-be-processed data flow and the data flow of each target application type, to obtain a feature distance between the to-be-processed data flow and each target data flow, and determining the application type of the to-be-processed data flow based on the feature distance using a classification algorithm. It can be learned that different dimensions are of different importance in data flow classification, and therefore different dimensions have different weights. In this way, considering a weight in application type classification of the data flow accuracy of application type classification of the data flow is further improved.

In an implementation, that the processor performs weighted processing on the static model distance and the dynamic model distance that are between the to-be-processed data flow and the data flow of each target application type to obtain the feature distance between the to-be-processed data flow and each target data flow includes obtaining a weight matrix based on a static behavior model and a dynamic behavior model of the data flow of each target application type, where the weight matrix allows minimizing a feature distance between data flows of a same application type and maximizing a feature distance between data flows of different application types, and performing, using the weight matrix, weighted processing on the static model distance and the dynamic model distance that are between the to-be-processed data flow and the data flow of each target application type, to obtain the feature distance between the to-be-processed data flow and each target data flow. It can be learned that static model distances and dynamic model distances of the data flows of different application types are maximized, and static model distances and dynamic model distances of the data flows of a same application type are minimized in order to obtain a weight of a feature distance of each piece of dimension information to form a weight matrix. Therefore, the obtained weight matrix is used for application type classification of the data flow, further improving accuracy of application type classification of the data flow.

In an implementation, the classification algorithm includes a K-nearest neighbor classification algorithm or a Naive Bayesian classification algorithm, and that the processor determines the application type of the to-be-processed data flow based on the feature distance using the classification algorithm includes determining, based on the K-nearest neighbor classification algorithm or the Naive Bayesian classification algorithm, a target application type corresponding to a minimum feature distance as the application type of the to-be-processed data flow. Therefore, using this processor to implement application type classification on the data flow better improves classification accuracy.

BRIEF DESCRIPTION OF DRAWINGS

To describe the technical solutions in some of the embodiments of this application more clearly, the following briefly describes the accompanying drawings describing some of the embodiments. The accompanying drawings in the following description show some embodiments of this application, and a person of ordinary skill in the art may derive other drawings from these accompanying drawings without creative efforts.

DESCRIPTION OF EMBODIMENTS

Figure 1:
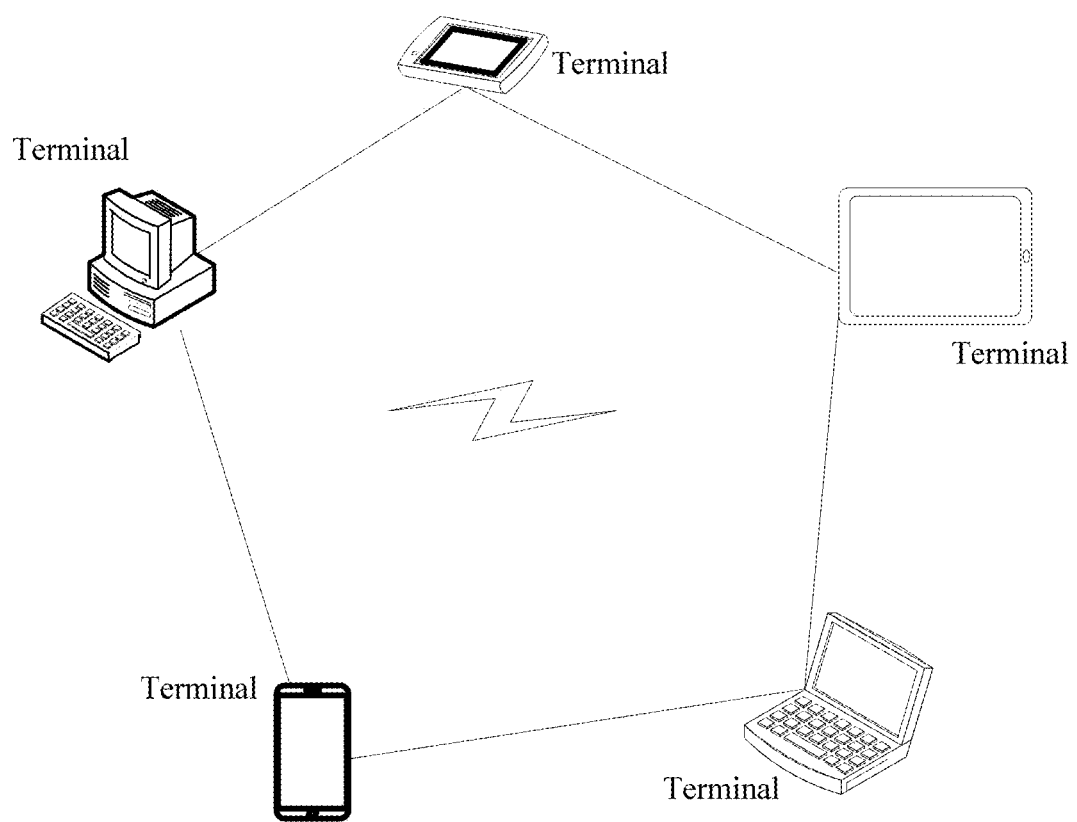
FIG. 1 is a schematic diagram of data communication performed by terminals in a communications network.

FIG. 1 is a schematic diagram of data communication performed by terminals in a communications network. The terminal may be various types of network devices, such as a mobile phone, a computer, a server, or another device that can perform network data communication. The terminals are connected in a wired or wireless manner, and perform data communication to form the communications network, for example, WI-FI, BLUETOOTH, Global Positioning System (GPS), or satellite communication.

In this application, application type classification on data flows for data communication performed by the terminals in the communications network may be implemented using the following solution.

Figure 2:
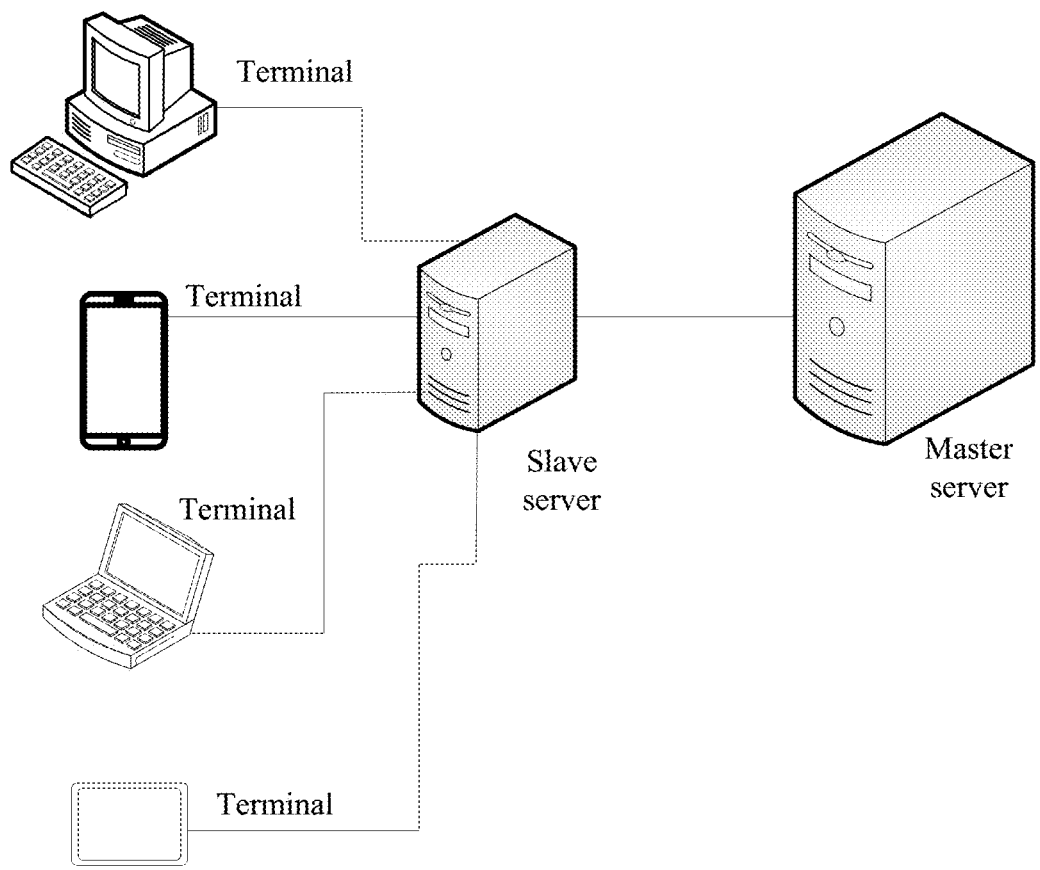
FIG. 2 is a diagram of an application example according to an embodiment of this application.
Figure 3:
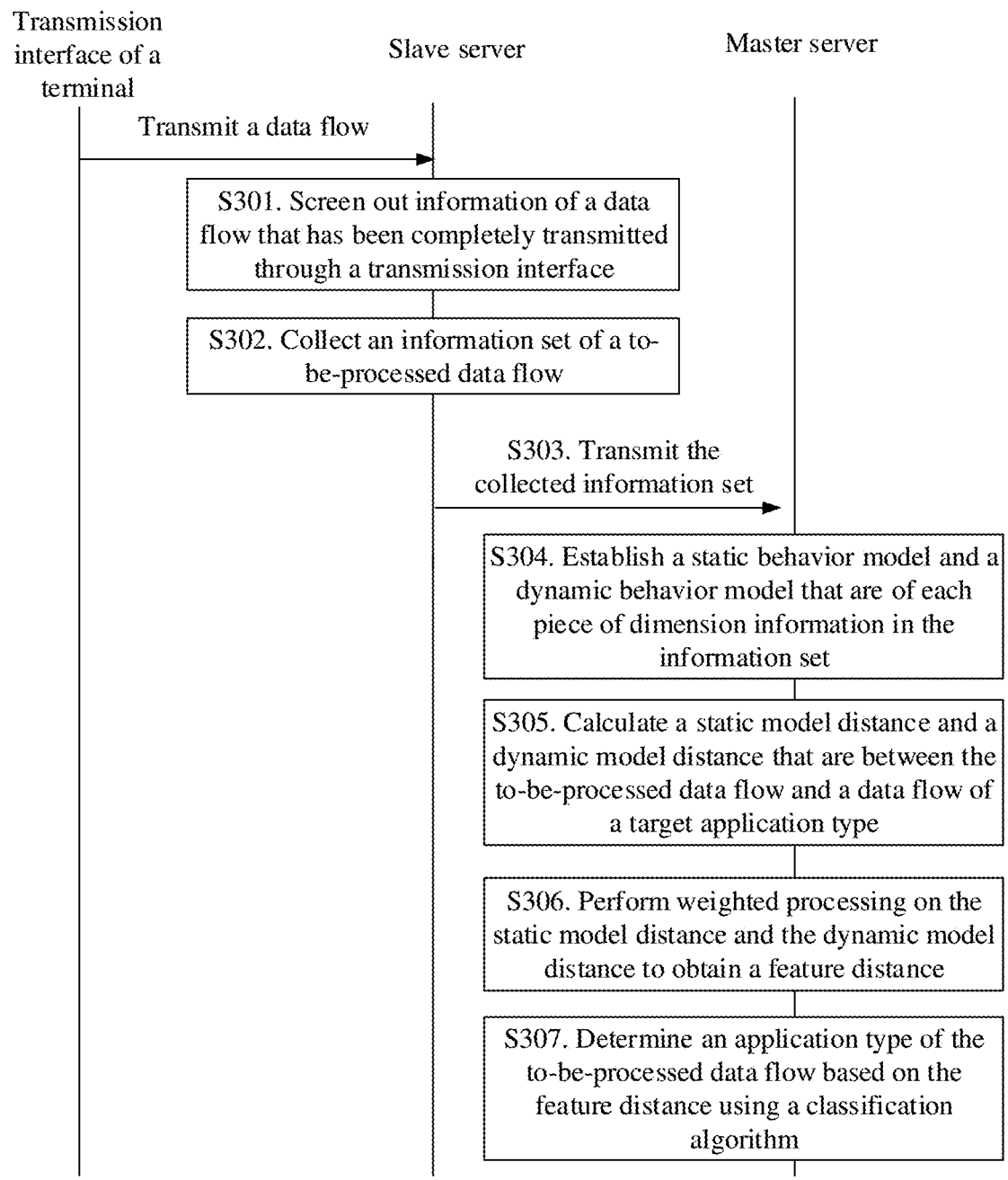
FIG. 3 is an implementation flowchart of a network data flow classification method according to an embodiment of this application.

FIG. 2 is a diagram of an example in which a server group is used to collect and classify data flows in a process of data communication performed by a terminal in an embodiment. The server group may include a slave server and a master server. FIG. 3 is an implementation flowchart of a network data flow classification method according to an embodiment of this application. To implement application type classification of data flows in a communications network, after transmitting the data flows through transmission interfaces of various terminals, a server group may perform the following steps.

Step S301. A slave server performs screening on the data flows transmitted through the transmission interfaces of the terminals to screen out a data flow that has been transmitted completely.

Step S302. The slave server collects information sets of remaining data flows that have not been transmitted completely.

Step S303. The slave server transmits these collected information sets to a master server.

The data flow that has been transmitted completely herein is a data flow in which all packets arrive at a destination. A destination of a data flow may be a terminal to which a transmission interface belongs, or another terminal that has a data connection to the terminal to which the transmission interface belongs, to perform data transmission.

In this embodiment, when the terminals perform data flow transmission, the slave server is used to perform application type classification on the data flows that have been transmitted by the terminals but have not been transmitted to destinations, and then, based on a classification result, a transmission service with corresponding service performance or quality of service is provided for the data flows that have not been transmitted to the destinations in order to transmit the data flows to the destinations.

For example, fast transmission service performance is provided for a data flow of an interaction type, to ensure a real-time requirement of the data flow, a sufficient data throughput is provided for a data flow of a bulk data transmission type, to ensure smooth download of data such as a file or a video, a relatively large transmission bandwidth and data throughput are provided for a data flow of a stream application type, to ensure a real-time requirement of the data flow and satisfy a requirement for network transmission parameters such as jitter and a packet loss rate, a measure is taken to restrict and even prohibit a data flow of an abnormal type, to ensure network security and stability, and so on.

The slave server may screen out, in the following manner, the data flow that has been transmitted completely, based on that a last packet of a completely-transmitted Transmission Control Protocol (TCP) data flow is an end of data (FIN) packet, the slave server determines whether a last packet passing through a transmission interface so far is a FIN packet in order to determine whether a data flow to which the packet belongs has been transmitted completely, or based on that a difference between a timestamp of a last packet of a completely-transmitted User Datagram Protocol (UDP) data flow and a current system time exceeds a preset threshold, the slave server determines whether a difference between a timestamp of a last transmitted packet and the current system time exceeds the preset threshold in order to determine whether a data flow to which the packet belongs has been aged, that is, whether the data flow has been transmitted completely.

The slave server monitors the transmission interfaces of the terminals. In this way, in this embodiment, when monitoring arrival of a data flow, the slave server collects packet information of each packet in the data flow, collects data flow information of each data flow, generates a corresponding information set, and then reports the information sets to the master server in real time.

Figure 4A:
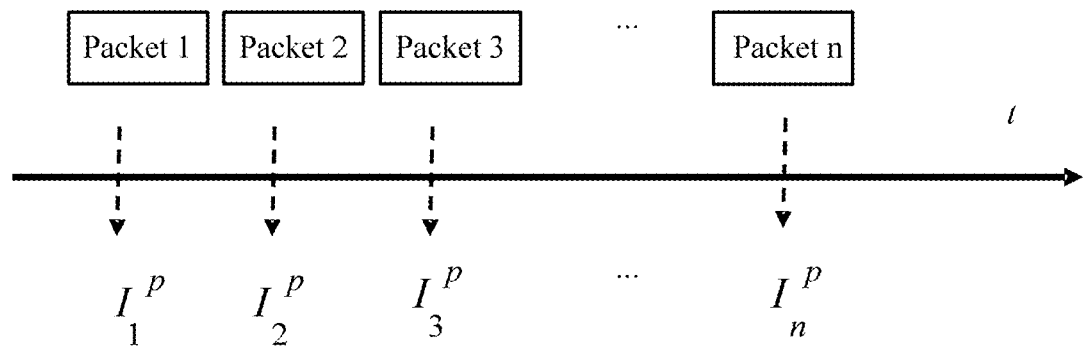
FIG. 4A, FIG. 4B, FIG. 5A, and FIG. 5B are diagrams of other application examples according to an embodiment of this application.

For example, for a transmission interface of each terminal, arrival of various packets of a data flow may be considered as a time sequence, and the packets in the data flow pass through the transmission interface sequentially. As time goes by, a $1^{st}$ packet to an $n^{th}$ packet of the data flow arrive, and the slave server collects packet information of these packets and generates an information set represented by $I_t^p$, as shown in FIG. 4A. Each piece of packet information in the information set $I_t^p$ includes but is not limited to the following information a packet length (packet size) and an arrival time interval between a current packet and a previous packet (packet inter-arrival time).

Figure 4B:
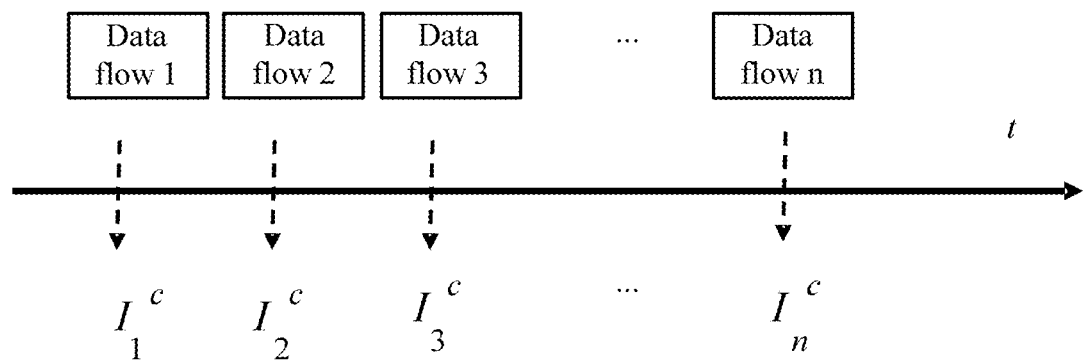

For a transmission interface of each terminal, arrival of various serially transmitted data flows may be considered as a time sequence, and the data flows pass through the transmission interface sequentially. As time goes by, a $1^{st}$ data flow to an $n^{th}$ data flow arrive, and the slave server collects data flow information of these data flows and generates an information set represented by $I_t^c$, as shown in FIG. 4B. Each piece of data flow information in the information set $I_t^c$ includes but is not limited to a data flow length (flow length), a quantity of packets in the data flow (packet number), data flow transmission duration (flow duration), and an arrival time interval between a current data flow and a previous data flow (flow inter-arrival time).

The information set $I_t^p$ of the packet information may be construed as a time sequence information set of data packets at a data flow layer, and the information set $I_t^c$ of the data flow information may be construed as a time sequence information set of data flows at a connection layer, where P and C are used to distinguish between a packet at the data flow layer and a connection at the connection layer.

After receiving the information sets uploaded by the slave server, the master server performs the following operations on an information set of each to-be-processed data flow to determine an application type of each to-be-processed data flow.

Step S304. Based on each piece of dimension information in an information set of a to-be-processed data flow, establish a static behavior model and a dynamic behavior model that are of each piece of dimension information.

The dimension information herein may be construed as information of an information item in each piece of packet information or each piece of data flow information in the information set of the to-be-processed data flow. For example, the packet length and the arrival time interval between the current packet and the previous packet are two pieces of dimension information in the information set of the packet information, the data flow length, the quantity of packets in the data flow, the data flow transmission duration, and the arrival time interval between the current data flow and the previous data flow are several pieces of dimension information in the information set of the data flow information.

When establishing the static behavior model, the master server first obtains marginal probability distribution of each piece of dimension information in the information set of the to-be-processed data flow. The marginal probability distribution of each piece of dimension information herein represents a rule of the dimension information, that is, a value selection rule of the dimension information (data flows of different application types have different rules for selecting a value of each dimension). Then, the master server maps the marginal probability distribution onto reproducing kernel space, to form a vector, namely the static behavior model.

When establishing the dynamic behavior model, the master server first obtains conditional probability distribution of each piece of dimension information in information sets, at two adjacent time moments, of the to-be-processed data flow. The conditional probability distribution of each piece of dimension information herein represents a correlation relationship of the dimension information between the two adjacent time moments in the to-be-processed data flow (in data flows of different application types, a correlation relationship of dimension information at the two adjacent time moments on each dimension is different). Then, the master server maps the conditional probability distribution onto the reproducing kernel space, to form an operator, namely the dynamic behavior model.

The following describes in detail establishment of the static behavior model and the dynamic behavior model of each piece of dimension information in the information set of the to-be-processed data flow.

The information set of the to-be-processed data flow includes a flow-layer information set $I_t^P$ and a connection-layer information set $I_t^c$. The flow-layer information set $I_t^P$ includes but is not limited to the following variables (dimension information): a data packet length (packet size): p; and a data packet arrival time interval (packet inter-arrival time): $\Delta t^p$.

The connection-layer information set $I_t^c$ includes but is not limited to the following variables: a data flow length (flow length): l; a quantity of packets in the data flow (packet number): n; data flow duration (flow duration): d; and a data flow arrival time interval (flow inter-arrival time): $\Delta t^f$.

Figure 5A:
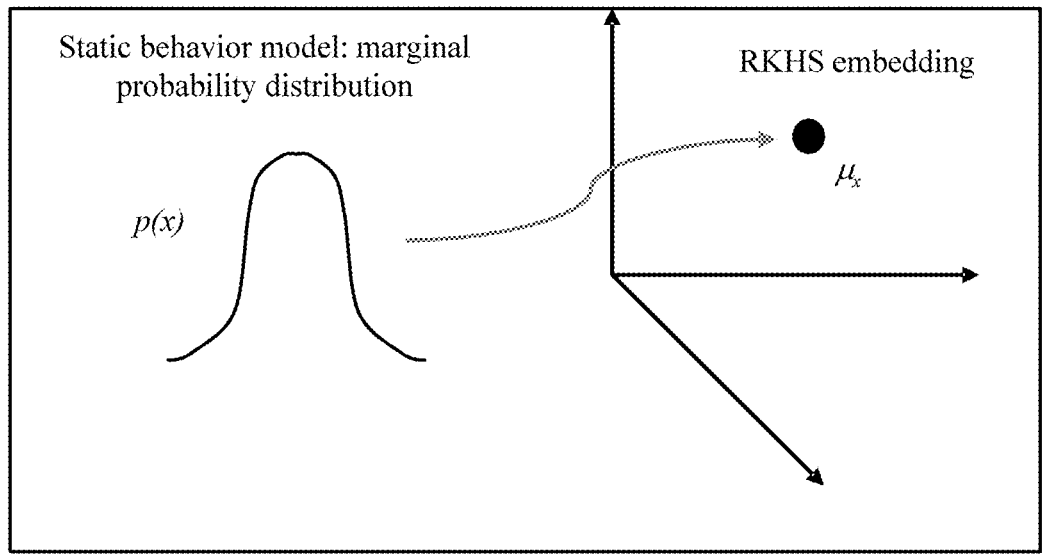

In this embodiment, establishing the static behavior model of the data flow by the master server is performing marginal probability distribution modeling on the foregoing variables. Herein, a reproducing kernel Hilbert space (RKHS) embedding solution may be used, or another parameterized or non-parameterized solution may be used, for example, a K-nearest neighbor based probability density estimation (k-nearest neighbor based probability density estimation) method. In this embodiment, in the RKHS embedding solution, marginal probability distribution of each variable (dimension information) is mapped onto the reproducing kernel space to form a variable, to obtain a static behavior model of each variable. RKHS embedding is performed, as shown by a mapping relationship in FIG. 5A.

A static behavior model of a variable of each dimension of the flow-layer information set $I_t^p$ is:

$$\{I_t^p\}_i \rightarrow P(\{I_t^p\}_i) \rightarrow \mu_{p,i},$$

where $\mu_{p,i}$ is a static behavior model of an $i^{th}$ piece of dimension information in the flow-layer (P) information set $I_t^p$.

A static behavior model of a variable of each dimension of the connection-layer information set $I_t^c$ is:

$$\{I_t^c\}_i \rightarrow P(\{I_t^c\}_i) \rightarrow \mu_{c,i},$$

where $\mu_{c,i}$ is a static behavior model of an $i^{th}$ piece of dimension information in the flow-layer (C) information set $I_t^c$.

A variable (dimension information) of an $i^{th}$ dimension of the flow-layer information set of the data flow is used as an example, and a modeling process is as follows.

It is assumed that an $i^{th}$ piece of dimension information of the flow-layer information set of the collected data flow is:

$$\{I_t^p\}_i = [x_1, x_2, \ldots, x_n].$$

A static behavior model of packet-length dimension information of the data flow may be obtained through calculation using the following formula (1):

$$\mu_{p,i} = \frac{1}{n}\sum_{i=1}^{n} \varphi(x_i), \qquad (1)$$

where $\varphi$ is a feature function vector of a kernel function $k(x,y)$.

The dynamic behavior model of the data flow is conditional probability distribution of variables of all dimensions of the information set of the data flow at the two adjacent time moments. The data flow may be considered as a time sequence, and a dynamic behavior of the time sequence is reflected by a statistical correlation of variable values of the time sequence at the two adjacent time moments. Therefore, in this embodiment, a dynamic behavior of a time sequence may be represented using conditional probability distribution of a variable of each dimension at the two adjacent time moments.

Figure 5B:
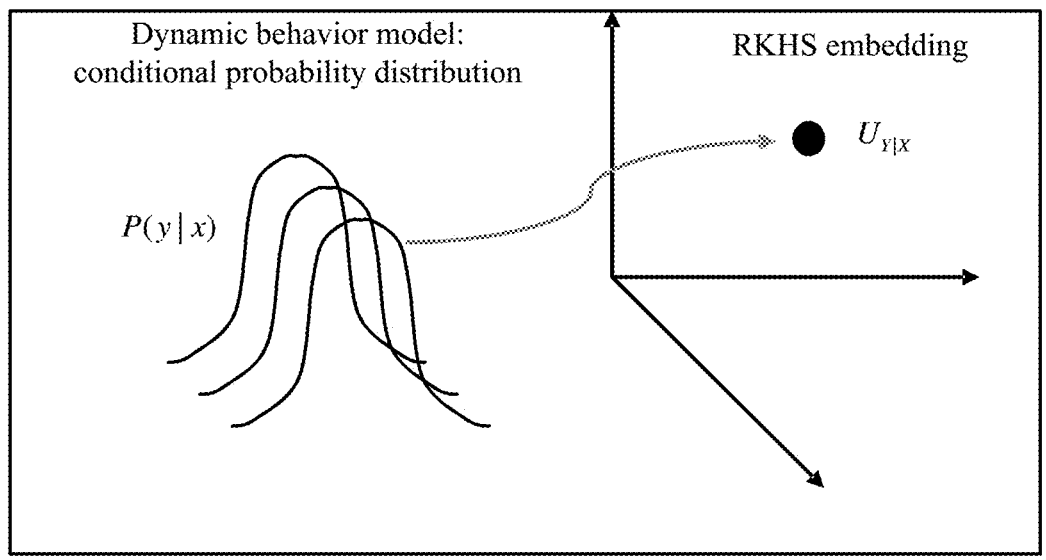

Herein, the RKHS embedding solution may be used, or another parameterized or non-parameterized solution may be used. In this embodiment, in the RKHS embedding solution, conditional probability distribution of each variable (dimension information) is mapped onto the reproducing kernel space to form an operator, that is, RKHS embedding is performed, as shown by a mapping relationship in FIG. 5B.

A dynamic behavior model of a variable of each dimension of the flow-layer information set $I_t^p$ is:

$$\{I_t^p\}_i, \{I_{t+1}^p\}_i \rightarrow P(\{I_{t+1}^p\}_i | \{I_t^p\}_i) \rightarrow U_{p,i},$$

where $U_{p,i}$ is a dynamic behavior model of an $i^{th}$ piece of dimension information in the flow-layer (P) information set $I_t^p$ at the two adjacent time moments t and t+1.

A dynamic behavior model of a variable of each dimension of the connection-layer information set $I_t^c$ is:

$$\{I_t^c\}_i, \{I_{t+1}^c\}_i \rightarrow P(\{I_{t+1}^c\}_i | I_t^c) \rightarrow U_{c,i},$$

where $U_{c,i}$ is a dynamic behavior model of an $i^{th}$ piece of dimension information in the flow-layer (C) information set $I_t^c$ at two adjacent time moments t and t+1.

The variable (dimension information) of the $i^{th}$ dimension of the flow-layer information set of the data flow is used as an example, and the modeling process is as follows.

It is assumed that the $i^{th}$ piece of dimension information of the flow-layer information set of the collected data flow at the time moment t is:

$$\{I_t^P\}_i = [x_1, x_2, \ldots, x_n].$$

The $i^{th}$ piece of dimension information at the time moment t+1 is:

$$\{I_{t+1}^P\}_i = [x_2, x_3, \ldots, x_n].$$

A dynamic behavior model of packet-length dimension information of the data flow at the two adjacent time moments may be obtained through calculation using the following formula (2):

$$U_{p,i} = \Phi_{t+1}(K_{tt} + \lambda I)^{-1} \Phi_t^T \qquad (2)$$

where $\Phi_{t+1} = [\varphi(x_2) \ \varphi P(x_3) \ \ldots \ \varphi(x_{n+1})]$, $\Phi_t = [\varphi(x_1) \ \varphi(x_2) \ \ldots \ \varphi(x_n)]$, $[K_{tt}]_{ij} = k(x_i, X_j)$, $\varphi$ is a feature function vector of a kernel function $k(x,y)$, $K_{tt}$ is a matrix formed by the dimension information in the flow-layer information set, $[K_{tt}]_{ij}$ is a $j^{th}$ matrix element in an $i^{th}$ row of the matrix, $\lambda$ is a regularization parameter and may be defined by a user based on a requirement, and I is a unit matrix, namely, a diagonal matrix in which a matrix element on a diagonal line is 1.

Step S305. The master server calculates a static model distance between the static behavior model of each piece of dimension information and a target static behavior model of a corresponding dimension of each preset application type, and calculates a dynamic model distance between the dynamic behavior model of each piece of dimension information and a target dynamic behavior model of the corresponding dimension of each preset application type.

The target static behavior model and the target dynamic behavior model herein are obtained by the master server by periodically collecting information sets of data flows of different target application types in a network in advance and performing modeling. For a specific solution of obtaining these target static behavior models and target dynamic behavior models, refer to an implementation solution of obtaining, by the master server, the static behavior model and the dynamic behavior model of each piece of dimension information of the to-be-processed data flow.

Herein, an information set of a data flow of a target application type is an information set of a data flow of a known application type. The target application type herein may be defined based on a service requirement, for example, an elephant flow (a data flow with huge traffic), a mice flow (a data flow with small traffic), a video stream, SKYPE, EDONKEY, File Transfer Protocol (FTP), Secure Shell (SSH), or another type.

The static model distance is a distance between the static behavior model of each piece of dimension information of the to-be-processed data flow and a target static behavior model of a corresponding dimension of each target application type, that is, a distance of marginal probability distribution of each piece of dimension information. The following describes calculation of the static model distance using an example.

A to-be-processed data flow A and a data flow B of a target application type are used as an example. A has information sets $\{I_t^P\}_i^A$ and $\{I_t^c\}_i^A$, and B has information sets $\{I_t^P\}_i^B$ and $\{I_t^c\}_i^B$. The master server calculates static behavior models of the data flows A and B: $\mu_{p,i}^A$, $\mu_{p,i}^B$, and $\mu_{c,i}^B$. Then, the master server calculates a static model distance between the static behavior models of the two data flows using the following formulas (3) and (4):

$$D[p(\{I_t^P\}_i^A) \| p(\{I_t^P\}_i^B)] = \|\mu_{p,i}^A - \mu_{p,i}^B\| \qquad (3)$$

$$D[p(\{I_t^c\}_i^A) \| p(\{I_t^c\}_i^B)] = \|\mu_{c,i}^A - \mu_{c,i}^B\| \qquad (4)$$

Herein, a variable, for example, a packet length, of an $i^{th}$ dimension of a flow-layer information set of a data flow is used as an example. The static behavior models of the data flows A and B are $$\mu_{p,i}^A = \frac{1}{n} \sum_{j=1}^n \varphi(x_j^A) \text{ and } \mu_{p,i}^B = \frac{1}{n} \sum_{j=1}^n \varphi_B(x_j^B),$$

respectively. A static model distance between the static behavior models, of the packet length, of the data flows A and B is $$D\left[\{I_t^P\}_i^A \| \{I_t^P\}_i^B\right] = \|\mu_{p,i}^A - \mu_{p,i}^B\| = \sqrt{\frac{1}{n^2} tr\{K_{tt}^A - 2K_{tt}^{AB} + K_{tt}^B\}},$$

where $$[K_{tt}^A]_{ij} = k(x_i^A, x_j^A), [K_{tt}^{AB}]_{ij} = k(x_i^A, x_j^B), \text{ and } [K_{tt}^B]_{ij} = k(x_i^B, x_j^B).$$

The dynamic model distance is a distance between the dynamic behavior model of each piece of dimension information of the to-be-processed data flow and a target dynamic behavior model of the corresponding dimension of each target application, that is, a distance of conditional probability distribution of each piece of dimension information at the two adjacent time moments. The following describes calculation of the dynamic model distance using an example.

The to-be-processed data flow A and the data flow B of the target application type are used as an example. A has the information sets $\{I_t^P\}_i^A$ and $\{I_t^c\}_i^A$, and B has the information sets $\{I_t^P\}_i^B$ and $\{I_t^c\}_i^B$. The master server calculates dynamic behavior models of the data flows A and B: $U_{p,i}^A$, $U_{c,i}^A$, $U_{p,i}^B$, and $U_{c,i}^B$. Then, the master server calculates a dynamic model distance between the dynamic behavior models of the two data flows using the following formulas (5) and (6):

$$D[p(\{I_{t+1}^P\}_i^A | \{I_t^P\}_i^A) \| p(\{I_{t+1}^P\}_i^B | \{I_t^P\}_i^B)] = \|U_{p,i}^A - U_{p,i}^B\| \qquad (5)$$

$$D[p(\{I_{t+1}^c\}_i^A | \{I_t^c\}_i^A) \| p(\{I_{t+1}^c\}_i^B)] = \|U_{c,i}^A - U_{c,i}^B\| \qquad (6)$$

Herein, a variable, for example, a packet length, of an $i^{th}$ dimension of a flow-layer information set of a data flow is used as an example. The dynamic behavior models of the data flows A and B are $U_{p,i}^A = \Phi_{t+1}^A (K_{tt}^A + \lambda I)^{-1} [\Phi_t^A]^T$ and $U_{p,i}^B = \Phi_{t+1}^B (K_{tt}^B + \lambda I)^{-1} [\Phi_t^B]^T$, respectively. A dynamic model distance between the dynamic behavior models, of the packet length, of the data flows A and B at the two adjacent time moments is $$D\left[p(\{I_{t+1}^P\}_i^A | \{I_t^P\}_i^A) \| p(\{I_{t+1}^P\}_i^B | \{I_t^P\}_i^B)\right] = \|U_{p,i}^A - U_{p,i}^B\|,$$

where $$\|U_{p,i}^A - U_{p,i}^B\| = tr\{K_{t+1,t+1}^A (K_{tt}^A + \lambda nI)^{-1} K_{tt}^A (K_{tt}^A + \lambda nI)^{-1}\} -$$

-continued
$$2tr\{K_{t+1,t+1}^{BA}(K_{tt}^{A}+\lambda nI)^{-1}K_{tt}^{AB}(K_{tt}^{B}+\lambda nI)^{-1}\}+$$
$$tr\{K_{t+1,t+1}^{B}(K_{tt}^{B}+\lambda nI)^{-1}K_{tt}^{B}(K_{tt}^{B}+\lambda nI)^{-1}\}.$$

It can be learned from the foregoing solution that a matrix is separately used to represent a vector of the static model distance between the to-be-processed data flow A and the data flow B of the target application type, a vector of the dynamic model distance between the to-be-processed data flow A and the data flow B of the target application type, and a vector of a feature distance between the to-be-processed data flow A and the data flow B of the target application type:
the vector of the static model distance:

$$D^{p}(A,B) = \begin{bmatrix} D[\{I_{t}^{p}\}_{1}^{A} \| \{I_{t}^{p}\}_{1}^{B}] \\ \vdots \\ D[\{I_{t}^{p}\}_{n_{p}}^{A} \| \{I_{t}^{p}\}_{n_{p}}^{B}] \\ D[p(\{I_{t+1}^{p}\}_{1}^{A} \mid \{I_{t}^{p}\}_{1}^{A}) \| p(\{I_{t+1}^{p}\}_{1}^{B} \mid \{I_{t}^{p}\}_{1}^{B})] \\ \vdots \\ D[p(\{I_{t+1}^{p}\}_{n_{p}}^{A} \mid \{I_{t}^{p}\}_{n_{p}}^{A}) \| p(\{I_{t+1}^{p}\}_{n_{p}}^{B} \mid \{I_{t}^{p}\}_{n_{p}}^{B})] \end{bmatrix},$$

the vector of the dynamic model distance:

$$D^{c}(A,B) = \begin{bmatrix} D[\{I_{t}^{c}\}_{1}^{A} \| \{I_{t}^{c}\}_{1}^{B}] \\ \vdots \\ D[\{I_{t}^{c}\}_{n_{c}}^{A} \| \{I_{t}^{c}\}_{n_{c}}^{B}] \\ D[p(\{I_{t+1}^{c}\}_{1}^{A} \mid \{I_{t}^{c}\}_{1}^{A}) \| p(\{I_{t+1}^{c}\}_{1}^{B} \mid \{I_{t}^{c}\}_{1}^{B})] \\ \vdots \\ D[p(\{I_{t+1}^{c}\}_{n_{c}}^{A} \mid \{I_{t}^{c}\}_{n_{c}}^{A}) \| p(\{I_{t+1}^{c}\}_{n_{c}}^{B} \mid \{I_{t}^{c}\}_{n_{c}}^{B})] \end{bmatrix},$$

and the vector of the feature distance:

$$D(A,B) = \begin{bmatrix} D^{p}(A,B) \\ D^{c}(A,B) \end{bmatrix}.$$

Step S306. The master server performs weighted processing on the static model distance and the dynamic model distance that are between the to-be-processed data flow and the data flow of each target application type to obtain a feature distance between the to-be-processed data flow and the data flow of each target application type.

The master server obtains an optimal distance weight matrix in advance through training in order to minimize a feature distance between data flows of a same application type and maximize a feature distance between data flows of different application types.

Further, the master server periodically collects a static behavior model and a dynamic behavior model of the data flow of each target application type, calculates a static model distance and a dynamic model distance between any two data flows, and minimizes a static model distance and a dynamic model distance between the data flows of a same application type, and maximizes a static model distance and a dynamic model distance between the data flows of different application types, to find an optimal weight matrix.

For example, data flows of a training sample are grouped into the following two data flow pair sets based on whether the data flows belong to a same application type:
S:$(f_i, f_j) \in$ S, where $f_i$, $f_j$ belong to a same application type, and D:$(f_i, f_j) \in$ D, where $f_i$ and $f_j$ belong to different application types.

Therefore, a positive semidefinite matrix X is found, to minimize the following target function:

$$\min_{X} \sum_{(f_i,f_j)\in S} \|f_i - f_j\|_X^2 - \log\left(\sum_{(f_i,f_j)\in D} \|f_i - f_j\|_X\right)$$

s.t. $X \succ 0$.

Herein, $\|f_i,f_j\|_X = \sqrt{D(i,j)^T A D(i,j)}$ indicates a target function of a feature distance between any two data flows. A weight matrix X obtained after the target function is minimized is an optimal matrix in order to minimize the feature distance between the data flows of a same application type and maximize the feature distance between the data flows of different application types.

Matrix calculation is performed based on the optimal weight matrix X obtained based on the foregoing solution and the feature distance vector, to obtain a final feature distance.

Step S307. Determine an application type of the to-be-processed data flow based on the feature distance between the to-be-processed data flow and the data flow of each target application type using a classification algorithm.

In this embodiment, K-Nearest Neighbor (also referred to as KNN), Naive Bayesian, or the like may be used for classification. A target application type corresponding to a minimum feature distance is determined as the application type of the to-be-processed data flow to implement application type classification of the data flow.

It can be learned from the foregoing solution that, according to the network data flow classification method provided in this embodiment of this application, probability distribution is calculated to implement application type classification of data flows, and therefore behavior modes representing different application types are more accurate. This avoids complex and low-efficiency feature design.

Further, in this application, based on a difference of an application type between static and dynamic behavior modes, more accurate information is provided for application type classification.

In addition, in this application, importance of a feature distance of each dimension is obtained through training using historical training data. Further, periodical learning can implement solution adaptation.

Figure 6:
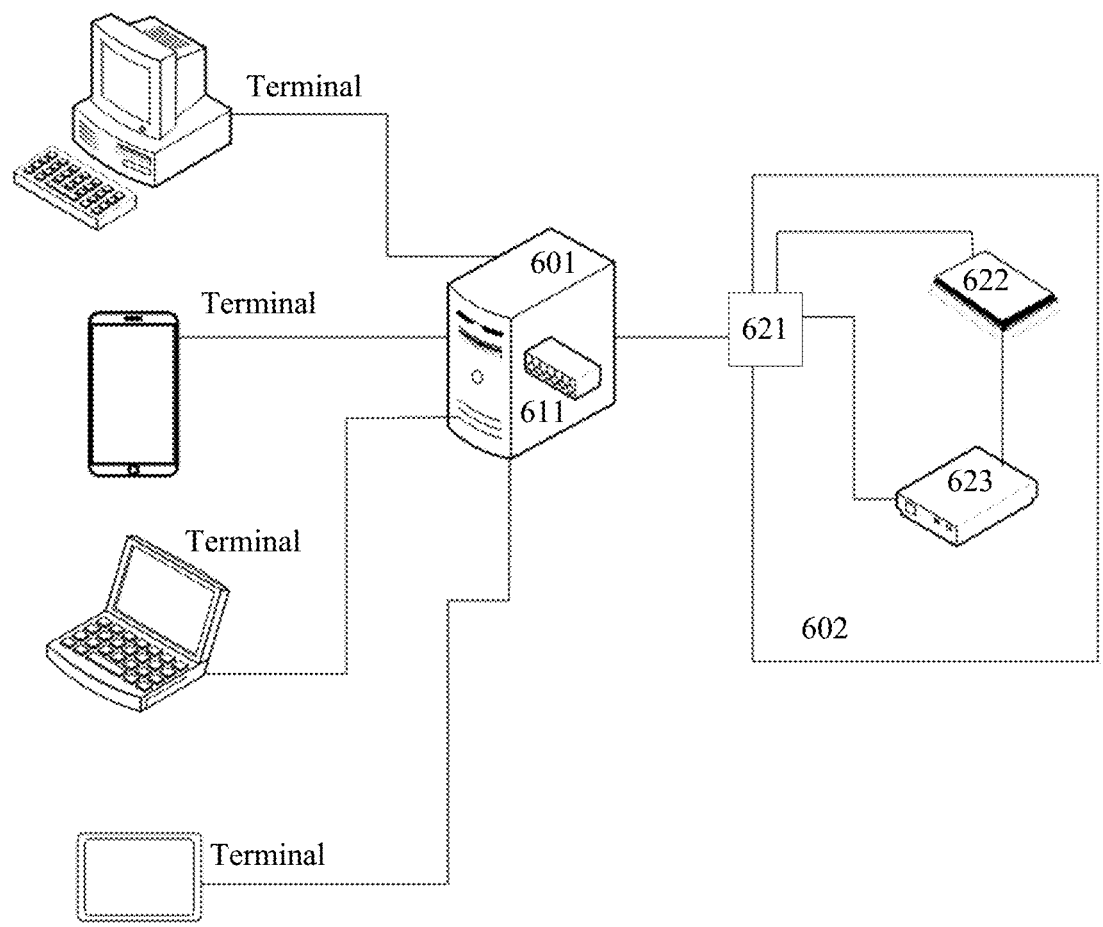
FIG. 6 is a schematic structural diagram of a network data flow classification system according to an embodiment of this application.

FIG. 6 is a detailed structural diagram of a network data flow classification system constituted by the slave server and the master server in FIG. 2.

A slave server 601 includes at least an information collection module 611 configured to collect an information set of a to-be-processed data flow transmitted by each terminal, where the information set includes a plurality of pieces of dimension information.

A master server 602 may include a data interface 621 configured to obtain the information set collected by the information collection module 611, a memory 622 configured to store an application program and data generated during running of the application program, and a processor 623, connected to the data interface 621, and configured to run the application program to establish a static behavior model and a dynamic behavior model that are of each piece of dimension information in the information set, obtain, using the static behavior model and the dynamic behavior model respectively, a static model distance and a dynamic model distance that are between the to-be-processed data flow and a data flow of each target application type, and determine an application type of the to-be-processed data flow based on the static model distance and the dynamic model distance that are between the to-be-processed data flow and the data flow of each target application type.

The embodiments in this specification are all described in a progressive manner, for same or similar parts in the embodiments, reference may be made to these embodiments, and each embodiment focuses on a difference from other embodiments.

What is claimed is:

1. A network data flow classification method, comprising:
   collecting an information set describing a first data flow, wherein the information set comprises a plurality of pieces of dimension information;
   establishing a static behavior model separately for each piece of the dimension information in the information set, wherein the static behavior model represents a value selection rule of a piece of the dimension information;
   establishing a dynamic behavior model separately for each piece of the dimension information in the information set, wherein the dynamic behavior model represents a correlation relationship of the piece of the dimension information between two adjacent time moments;
   obtaining a static model distance between the first data flow and a data flow of each target application type using the static behavior model for the piece of the dimension information;
   obtaining a dynamic model distance between the first data flow and the data flow of each target application type using the dynamic behavior model for the piece of the dimension information;
   determining an application type of the first data flow based on the static model distance and the dynamic model distance; and
   processing the first data flow based on the application type of the first data flow.

2. The network data flow classification method of claim 1, wherein the information set comprises a first information set at a flow layer and a second information set at a connection layer, wherein the first information set comprises at least one of a packet length or a packet arrival time interval, and wherein the second information set comprises at least one of a data flow length, a quantity of packets in the first data flow, data flow duration, or a data flow arrival time interval.

3. The network data flow classification method of claim 2, further comprising:
   obtaining a first marginal probability distribution of each piece of dimension information in the first information set, wherein the first marginal probability distribution represents a value selection rule of the dimension information in the first information set;
   generating a static behavior model separately for each piece of the dimension information in the first information set based on the first marginal probability distribution;
   obtaining a first conditional probability distribution of each piece of the dimension information in the first information set, wherein the first conditional probability distribution represents a correlation relationship of dimension information between two adjacent time moments in the first information set;
   generating a dynamic behavior model separately for each piece of the dimension information in the first information set based on the first conditional probability distribution;
   obtaining a second marginal probability distribution of each piece of dimension information in the second information set, wherein the second marginal probability distribution represents a value selection rule of the dimension information in the second information set;
   generating a static behavior model separately for each piece of the dimension information in the second information set based on the second marginal probability distribution;
   obtaining a second conditional probability distribution of each piece of the dimension information in the second information set, wherein the second conditional probability distribution represents a correlation relationship of dimension information between two adjacent time moments in the second information set; and
   generating a dynamic behavior model of each piece of the dimension information in the second information set based on the second conditional probability distribution.

4. The network data flow classification method of claim 2, comprising:
   obtaining a static behavior model separately for each piece of dimension information in the first information set using an equation $$\mu_{p,i} = \frac{1}{n}\sum_{i=1}^{n}\varphi(x_i),$$

wherein $X_i$ is an $i^{th}$ piece of the dimension information in the first information set, wherein n is a quantity of pieces of the dimension information in the first information set, and wherein $\varphi$ is a feature function vector of a kernel function $k(x,Y)$; and
   obtaining a dynamic behavior model separately for each piece of the dimension information, at two adjacent time moments, in the first information set using an equation $U_{p,i} = \Phi_{t+1}(K_{tt}+\lambda I)^{-1}\Phi_t^T$ wherein t is a time moment, wherein $\Phi_{t+1} = [\varphi(X_2) \; \varphi(x_3) \; \ldots \; \varphi(x_{n+1})]$, wherein $\Phi_t = [\varphi(x_1) \; \varphi(x_2) \; \ldots \; ^{SM}(x_n)]$, wherein $K_{tt}$ is a matrix constituted by the dimension information in the first information set, wherein $[K_{tt}]_{ij}$ is a $j^{th}$ matrix element in $i^{th}$ row of the matrix, wherein $[K_{tt}]_{ij} = k(x_i,x_j)$, wherein $\lambda$ is a preset parameter, and wherein I is a unit matrix.

5. The network data flow classification method of claim 2, wherein further comprising:
   obtaining, using an equation $$D\big[\{I_t^P\}_i^A \;\|\; \{I_t^P\}_i^B\big] = \|\mu_{p,i}^A - \mu_{p,i}^B\| = \sqrt{\frac{1}{n^2}tr\{K_{tt}^A - 2K_{tt}^{AB} + K_{tt}^B\}},$$

a flow-layer static model distance between a data flow A and a data flow B of each target application type, wherein $\mu_{p,i}^A$ is a static behavior model of a first information set ($I_t^P$) of the data flow A, wherein $\mu_{p,i}^B$ is a flow-layer static behavior model of the data flow B of the target application type, wherein $K_{tt}$ is a matrix constituted by a dimension information in an information set, wherein $[K_{tt}]_{ij}$ is a $j^{th}$ matrix element in an $i^{th}$ row of the matrix, wherein $k(x_i,x_j)$ is a kernel function, wherein $[K_{tt}^A]_{ij}=k(x_i^A,x_j^A)$ wherein $[K_{tt}^{AB}]_{ij}=k(x_i^A,x_j^B)$ wherein, $[K_{tt}^B]_{ij}=k(x_i^B,x_j^B)$ wherein n is a quantity of pieces of the dimension information in the information set, and wherein $x_i$ indicates an $i^{th}$ piece of the dimension information in the information set;

$$D[\{I_t^c\}_i^A \| \{I_t^c\}_i^B] = \|\mu_{c,i}^A - \mu_{c,i}^B\| = \sqrt{\frac{1}{n^2}tr\{K_{tt}^A - 2K_{tt}^{AB} + K_{tt}^B\}},$$

obtaining, using a connection-layer static model distance between the data flow A and the data flow B of each target application type, wherein $\mu_{c,i}^A$ is a static behavior model of a second information set ($I_t^c$) of the data flow A, and wherein $\mu_{c,i}^B$ is a connection-layer static behavior model of the data flow B of the target application type;

obtaining, using $D[p(\{I_{t+1}^p\}_i^A|\{I_t^p\}_i^A)\|p(\{I_{t+1}^p\}_i^B|\{I_t^p\}_i^B)]=\|U_{p,i}^A-U_{p,i}^B\|$, a flow-layer dynamic model distance between the data flow A and the data flow B of each target application type, wherein $U_{p,i}^A$ is a dynamic behavior model of the $I_t^p$ of the data flow A, and wherein $U_{p,i}^B$ is a flow-layer dynamic behavior model of the data flow B of the target application type; and obtaining, using $D[p(\{I_{t+1}^c\}_i^A|\{I_t^c\}_i^A)\|p(\{I_{t+1}^c\}_i^B|\{I_t^c\}_i^B)]=\|U_{c,i}^A-U_{c,i}^B\|$, a connection-layer dynamic model distance between the data flow A and the data flow B of each target application type, wherein $U_{c,i}^A$ is a dynamic behavior model of the $I_t^c$ of the data flow A, and wherein $U_{c,i}^B$ is a connection-layer dynamic behavior model of the data flow B of the target application type.

6. The network data flow classification method of claim 2, further comprising:
obtaining a static behavior model separately for each piece of dimension $$\mu_{c,i} = \frac{1}{n}\sum_{i=1}^{n}\varphi(x_i),$$

information in the second information set using an equation wherein $x_i$ is an $i^{th}$ piece of the dimension information in the second information set, wherein $\varphi$ is a feature function vector of a kernel function $k(x,y)$, and wherein n is a quantity of pieces of the dimension information in the second information set; and
obtain a dynamic behavior model separately for each piece of the dimension information, at two adjacent time moments, in the first information set using an equation $U_{c,i}=\Phi_{t+1}(K_{tt}+\lambda I)^{-1}\Phi_t^T$ wherein t is a time moment, wherein $\Phi_{t+1}=[\varphi(X_2)\ \varphi(x_3)\ \ldots\ \varphi(x_{n+1})]$, wherein $\Phi_t=[\varphi(x_1)\ \varphi(x_2)\ \ldots\ ^{SM}(x_n)]$, wherein $K_{tt}$ is a matrix constituted by the dimension information in the first information set, wherein $[K_{tt}]_{ij}$ is a $j^{th}$ matrix element in $i^{th}$ row of the matrix, wherein $[K_{tt}]_{ij}=k(x_i,x_j)$, wherein $\lambda$ is a preset parameter, and wherein I is a unit matrix.

7. The network data flow classification method of claim 1, wherein determining the application type of the first data flow comprises:

performing weighted processing on the static model distance and the dynamic model distance between the first data flow and the data flow of each target application type to obtain a feature distance between the first data flow and each target data flow; and
determining the application type of the first data flow based on the feature distance using a classification algorithm.

8. The network data flow classification method of claim 7, wherein performing the weighted processing comprises:
obtaining a weight matrix based on a static behavior model and a dynamic behavior model of the data flow of each target application type, wherein the weight matrix minimizes a feature distance among data flows of a same application type and maximizes a feature distance among data flows of different application types; and
performing, using the weight matrix, the weighted processing on the static model distance and the dynamic model distance that are between the first data flow and the data flow of each target application type to obtain the feature distance between the first data flow and each target data flow.

9. The network data flow classification method of claim 7, wherein the classification algorithm comprises a K-nearest neighbor classification algorithm, and wherein determining the application type of the first data flow comprises determining, based on the K-nearest neighbor classification algorithm, a target application type corresponding to a minimum feature distance as the application type of the first data flow.

10. The network data flow classification method of claim 7, wherein the classification algorithm comprises a Naive Bayesian classification algorithm, and wherein determining the application type of the first data flow comprises determining, based on the Naive Bayesian classification algorithm, a target application type corresponding to a minimum feature distance as the application type of the first data flow.

11. A network data flow classification system, comprising:
a slave server comprising an information collection circuit configured to collect an information set describing a first data flow received from a terminal, wherein the information set comprises a plurality of pieces of dimension information; and
a master server coupled to the slave server and comprising:
a data interface configured to obtain the information set from the information collection circuit;
a memory coupled to the data interface and configured to store an application program and data generated during running of the application program; and
a processor coupled to the data interface and the memory and configured to run the application program to:
establish a static behavior model separately for each piece of the dimension information in the information set, wherein the static behavior model represents a value selection rule of a piece of the dimension information:
establish a dynamic behavior model separately for each piece of the dimension information in the information set, wherein the dynamic behavior model represents a correlation relationship of the piece of the dimension information between two adjacent time moments;

obtain a static model distance between the first data flow and a data flow of each target application type using the static behavior model for the piece of the dimension information;

obtain a dynamic model distance between the first data flow and the data flow of each target application type using the dynamic behavior model for the piece of the dimension information; and determine an application type of the first data flow based on the static model distance and the dynamic model distance between the first data flow and the data flow of each target application type.

12. The network data flow classification system of claim 11, wherein the information set comprises a first information set at a flow layer and a second information set at a connection layer, wherein the first information set comprises at least one of a packet length or a packet arrival time interval, and wherein the second information set comprises at least one of a data flow length, a quantity of packets in the first data flow, data flow duration, or a data flow arrival time interval.

13. The network data flow classification system of claim 12, wherein the processor is further configured to run the application program to:

obtain a first marginal probability distribution of each piece of dimension information in the first information set, wherein the first marginal probability distribution represents a value selection rule of the dimension information in the first information set;

generate a static behavior model separately for each piece of the dimension information in the first information set based on the first marginal probability distribution;

obtain a first conditional probability distribution of each piece of the dimension information in the first information set, wherein the first conditional probability distribution represents a correlation relationship of dimension information between two adjacent time moments in the first information set;

generate a dynamic behavior model separately for each piece of the dimension information in the first information set based on the first conditional probability distribution;

obtain a second marginal probability distribution of each piece of dimension information in the second information set, wherein the second marginal probability distribution represents a value selection rule of the dimension information in the second information set;

generate a static behavior model separately for each piece of the dimension information in the second information set based on the second marginal probability distribution;

obtain a second conditional probability distribution of each piece of the dimension information in the second information set, wherein the second conditional probability distribution represents a correlation relationship of dimension information between two adjacent time moments in the second information set; and generate a dynamic behavior model of each piece of the dimension information in the second information set based on the second conditional probability distribution.

14. The network data flow classification system of claim 12, wherein the processor is further configured to run the application program to:

obtain a static behavior model separately for each piece of dimension information in the first information set using an equation $$\mu_{p,i} = \frac{1}{n}\sum_{i=1}^{n}\varphi(x_i),$$

wherein $x_i$ is an $i^{th}$ piece of the dimension information in the first information set, wherein n is a quantity of pieces of the dimension information in the first information set, and wherein $\varphi$ is a feature function vector of a kernel function $k(x,y)$; and obtain a dynamic behavior model separately for each piece of the dimension information, at two adjacent time moments, in the first information set using an equation $U_{p,i}=\Phi_{t+1}(K_{tt}+\lambda I)^{-1}\Phi_t^T$ wherein t is a time moment, wherein $\Phi_{t+1}=[\varphi(X_2)\ \varphi(x_3)\ \ldots\ \varphi(x_{n+1})]$, wherein $\Phi_t=[\varphi(x_1)\ \varphi(x_2)\ \ldots\ ^{SM}(x_n)]$, wherein $K_{tt}$ is a matrix constituted by the dimension information in the first information set, wherein $[K_{tt}]_{ij}$ is a $j^{th}$ matrix element in $i^{th}$ row of the matrix, wherein $[K_{tt}]_{ij}=k(x_i,x_j)$, wherein $\lambda$ is a preset parameter, and wherein I is a unit matrix.

15. The network data flow classification system of claim 12, wherein the processor is further configured to run the application program to:

$$D[\{I_t^P\}_i^A \| \{I_t^P\}_i^B] = \|\mu_{p,i}^A - \mu_{p,i}^B\| = \sqrt{\frac{1}{n^2}tr\{K_{tt}^A - 2K_{tt}^{AB} + K_{tt}^B\}},$$

obtain, using a flow-layer static model distance between a data flow A and a data flow B of each target application type, wherein $\mu_{p,i}^A$ is a static behavior model of a first information set ($I_t^P$) of the data flow A, wherein $\mu_{p,i}^B$ is a flow-layer static behavior model of the data flow B of the target application type, wherein $K_{tt}$ is a matrix constituted by a dimension information in an information set, wherein $[K_{tt}]_{ij}$ is a $j^{th}$ matrix element in an $i^{th}$ row of the matrix, wherein $k(x_i,x_j)$ is a kernel function, wherein $[K_{tt}^A]_{ij}=k(x_i^A,x_j^A)$ wherein $[K_{tt}^{AB}]_{ij}=k(x_i^A,x_j^B)$ wherein, $[K_{tt}^B]_{ij}=k(x_i^B,x_j^B)$ wherein n is a quantity of pieces of the dimension information in the information set, and wherein $x_i$ indicates an $i^{th}$ piece of the dimension information in the information set;

$$D[\{I_t^c\}_i^A \| \{I_t^c\}_i^B] = \|\mu_{c,i}^A - \mu_{c,i}^B\| = \sqrt{\frac{1}{n^2}tr\{K_{tt}^A - 2K_{tt}^{AB} + K_{tt}^B\}},$$

obtaining, using a connection-layer static model distance between the data flow A and the data flow B of each target application type, wherein $\mu_{c,i}^A$ is a static behavior model of a second information set ($I_t^c$) of the data flow A, and wherein $\mu_{c,i}^B$ is a connection-layer static behavior model of the data flow B of the target application type;

obtaining, using $D[p(\{I_{t+1}^P\}_i^A|\{I_t^P\}_i^A)\| p(\{I_{t+1}^P\}_i^B|\{I_t^P\}_i^B)]=\|U_{p,i}^A-U_{p,i}^B\|$, a flow-layer dynamic model distance between the data flow A and the data flow B of each target application type, wherein $U_{p,i}^A$ s a dynamic behavior model of the $I_t^P$ of the data flow A, and wherein $U_{p,i}^B$ is a flow-layer dynamic behavior model of the data flow B of the target application type; and obtaining, using $D[p(\{I_{t+1}^c\}_i^A|\{I_t^c\}_i^A)\|p(\{I_{t+1}^c\}_i^B|\{I_t^c\}_i^B)]=\|U_{c,i}^A-U_{c,i}^B\|$, a connection-layer dynamic model distance between the data flow A and the data flow B of each target application type, wherein $U_{c,i}^A$ is a dynamic behavior model of the $I_t^c$ of the data flow A, and wherein $U_{c,i}^B$ is a connection-layer dynamic behavior model of the data flow B of the target application type.

16. The network data flow classification system of claim 12, wherein the processor is further configured to run the application program to:

obtain a static behavior model separately for each piece of dimension information in $$\mu_{c,i} = \frac{1}{n}\sum_{i=1}^{n}\varphi(x_i),$$

the second information set using an equation wherein $x_i$ is an $i^{th}$ piece of the dimension information in the second information set, wherein $\varphi$ is a feature function vector of a kernel function $k(x,y)$, and wherein n is a quantity of pieces of the dimension information in the second information set; and obtain a dynamic behavior model separately for each piece of the dimension information, at two adjacent time moments, in the first information set using an equation $U_{c,i}=\Phi_{t+1}(K_{tt}+\lambda I)^{-1}\Phi_t^T$ wherein t is a time moment, wherein $\Phi_{t+1}=[\varphi(X_2)\ \varphi(x_3)\ \ldots\ \varphi(x_{n+1})]$, wherein $\Phi_t=[\varphi(x_1)\ \varphi(x_2)\ \ldots\ ^{SM}(x_n)]$, wherein $K_{tt}$ is a matrix constituted by the dimension information in the first information set, wherein $[K_{tt}]_{ij}$ is a $j^{th}$ matrix element in $i^{th}$ row of the matrix, wherein $[K_{tt}]_{ij}=k(x_i,x_j)$ $[K_{tt}]_{ij}=k(x_i,x_j)$, wherein $\lambda$ is a preset parameter, and wherein I is a unit matrix.

17. The network data flow classification system of claim 11, wherein to determine the application type of the first data flow, the processor is further configured to run the application program to:

perform weighted processing on the static model distance and the dynamic model distance between the first data flow and the data flow of each target application type to obtain a feature distance between the first data flow and each target data flow; and determine the application type of the first data flow based on the feature distance using a classification algorithm.

18. The network data flow classification system of claim 17, wherein to perform the weighted processing on the static model distance and the dynamic model distance, the processor is further configured to run the application program to:

obtain a weight matrix based on a static behavior model and a dynamic behavior model of the data flow of each target application type, wherein the weight matrix minimizes a feature distance among data flows of a same application type and maximizes a feature distance among data flows of different application types; and perform, using the weight matrix, the weighted processing on the static model distance and the dynamic model distance between the first data flow and the data flow of each target application type to obtain the feature distance between the first data flow and each target data flow.

19. The network data flow classification system of claim 17, wherein the classification algorithm comprises a K-nearest neighbor classification algorithm, and wherein to determine the application type of the first data flow, the processor is further configured to run the application program to determine, based on the K-nearest neighbor classification algorithm, a target application type corresponding to a minimum feature distance as the application type of the first data flow.

20. The network data flow classification system of claim 17, wherein the classification algorithm comprises a Naive Bayesian classification algorithm, and wherein when determining the application type of the first data flow, the processor is further configured to run the application program to determine, based on the Naive Bayesian classification algorithm, a target application type corresponding to a minimum feature distance as the application type of the first data flow.

\* \* \* \* \*

UNITED STATES PATENT AND TRADEMARK OFFICE
CERTIFICATE OF CORRECTION

PATENT NO. : 10,999,175 B2
APPLICATION NO. : 16/362135
DATED : May 4, 2021
INVENTOR(S) : Zhitang Chen, Yanhui Geng and Georgios Trimponias It is certified that error appears in the above-identified patent and that said Letters Patent is hereby corrected as shown below:

In the Claims

Claim 4, Column 16, Line 27: "comprising:" should read "further comprising:"

Claim 4, Column 16, Line 41: "k(x,Y)" should read "k(x,y)"

Claim 4, Column 16, Line 47: "...$^{SM}(x_n)$]" should read "...$(x_n)$]"

Claim 5, Column 16, Line 54: "wherein further comprising:" should read "further comprising:"

Claim 5, Column 17, Line 1: "$[K_{tt}]_{ij}$is" should read "$[K_{tt}]ij$ is"

Claim 5, Column 17, Line 7: "in the information set;" should read "in the information set; obtaining, using"

Claim 5, Column 17, Line 14: "obtaining, using a connection-layer" should read "a connection-layer"

Claim 5, Column 17, Line 26: "$U_{p,i}^A$ s a dynamic" should read "$U_{p,i}^A$ is a dynamic"

Claim 6, Column 17, Line 41: "piece of dimension" should read "piece of dimension information in the second information set using an equation"

Claim 6, Column 17, Line 48: delete "information in the second information set using an equation"

Claim 6, Column 17, Line 54: "obtain a dynamic" should read "obtaining a dynamic"

Claim 6, Column 17, Line 56: "in the first information" should read "in the second information"

Claim 6, Column 17, Line 57: "$^T_t$ wherein t is a" should read "$^T_t$, wherein t is a"

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,999,175 B2

Claim 6, Column 17, Line 59: "...$^{SM}(x_n)$]" should read "...$(x_n)$]"

Claim 6, Column 17, Line 61: "first information set," should read "second information set,"

Claim 14, Column 20, Line 18: "$^T_t$ wherein t is a" should read "$^T_t$, wherein t is a"

Claim 14, Column 20, Line 20: "...$^{SM}(x_n)$]" should read "...$(x_n)$]"

Claim 15, Column 20, Line 28: "application program to:" should read "application program to: obtain, using"

Claim 15, Column 20, Line 35: "obtain, using a flow-later static" should read "a flow-later static"

Claim 15, Column 20, Line 42: "$[K_{tt}]_{ij}$is" should read "$[K_{tt}]$ij is"

Claim 15, Column 20, Line 44: "$X_j^A$) wherein" should read "$X_j^A$), wherein"

Claim 15, Column 20, Line 45: "$X_j^B$) wherein, [K" should read "$X_j^B$), wherein [K"

Claim 15, Column 20, Line 45: "$X_j^B$) wherein" should read "$X_j^B$), wherein"

Claim 15, Column 20, Line 49: "set;" should read "set; obtain, using"

Claim 15, Column 20, Line 56: "obtaining, using a connection-layer" should read "a connection-layer"

Claim 15, Column 20, Line 63: "obtaining, using" should read "obtain, using"

Claim 15, Column 20, Line 67: "$U_{p,i}^A$ s a dynamic" should read "$U_{p,i}^A$ is a dynamic"

Claim 15, Column 21, Line 4: "obtaining, using" should read "obtain, using"

Claim 16, Column 21, Line 17: "dimension information in" should read "dimension information in the second information set using an equation"

Claim 16, Column 21, Line 24: "the second information set using an equation wherein $x_i$ is an" should read "wherein $x_i$ is an"

Claim 16, Column 21, Line 32: "$^T_t$ wherein t is a" should read "$^T_t$, wherein t is a"

Claim 16, Column 21, Line 34: "...$^{SM}(x_n)$]" should read "...$(x_n)$]"

Claim 16, Column 21, Line 36: "first information set," should read "second information set"